Figure 1:
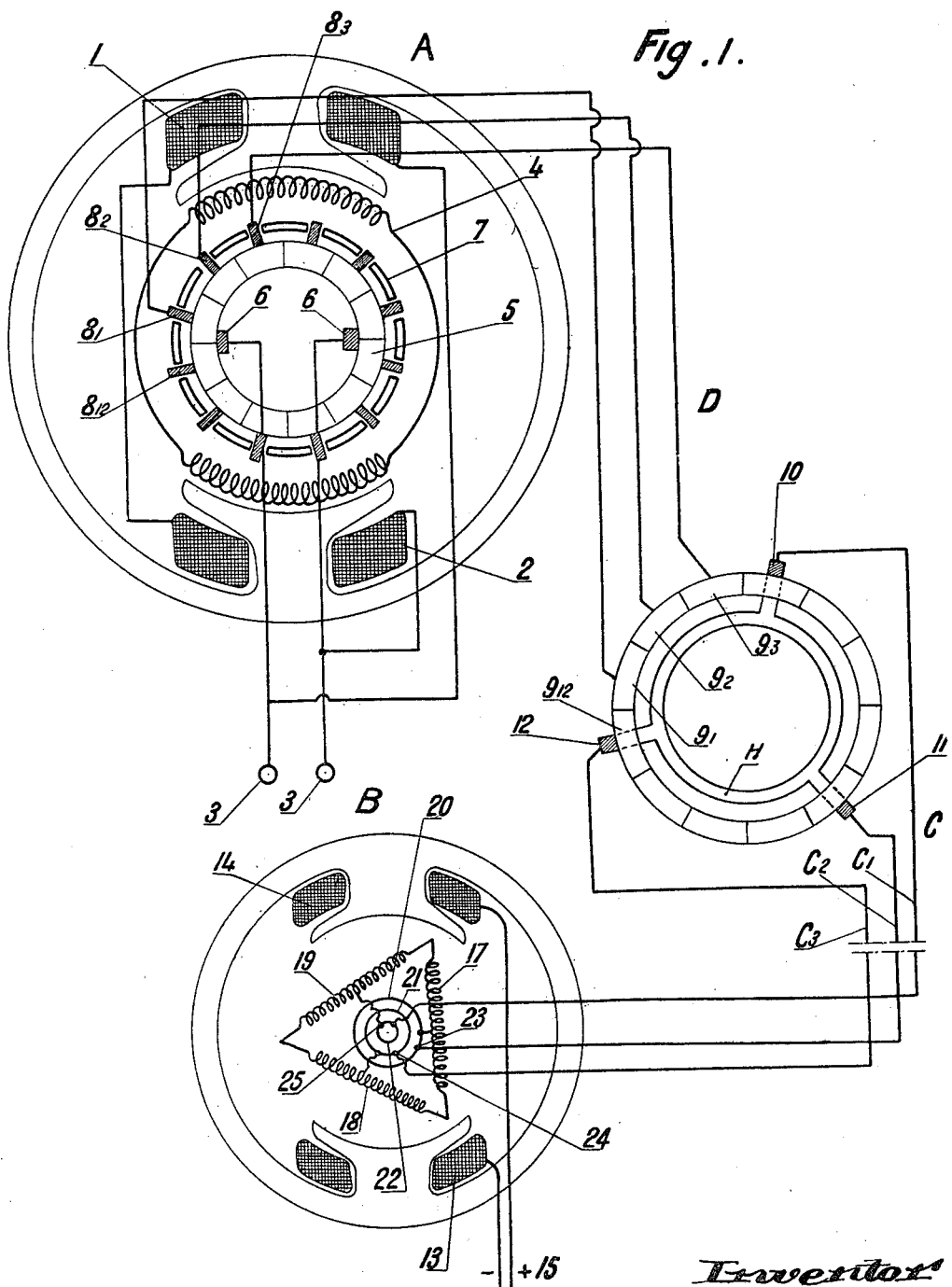

Feb. 2, 1926.

E. GRANAT

ELECTRIC DISTANT CONTROL SYSTEM

Filed May 14, 1924

1,571,262

5 Sheets-Sheet 2

Inventor
E. Granat
by Marks & Clerk
Attys.

Feb. 2, 1926.
E. GRANAT
1,571,262
ELECTRIC DISTANT CONTROL SYSTEM
Filed May 14, 1924    5 Sheets-Sheet 5
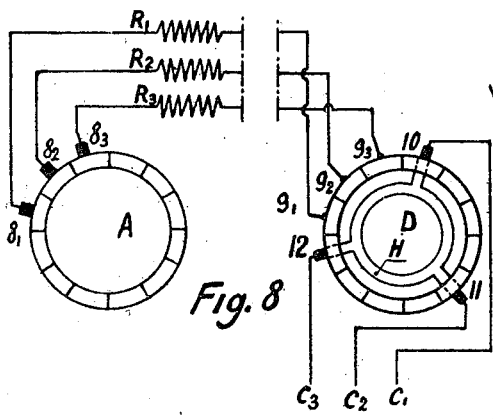
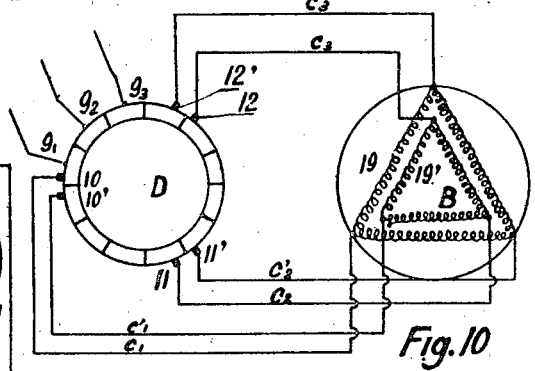
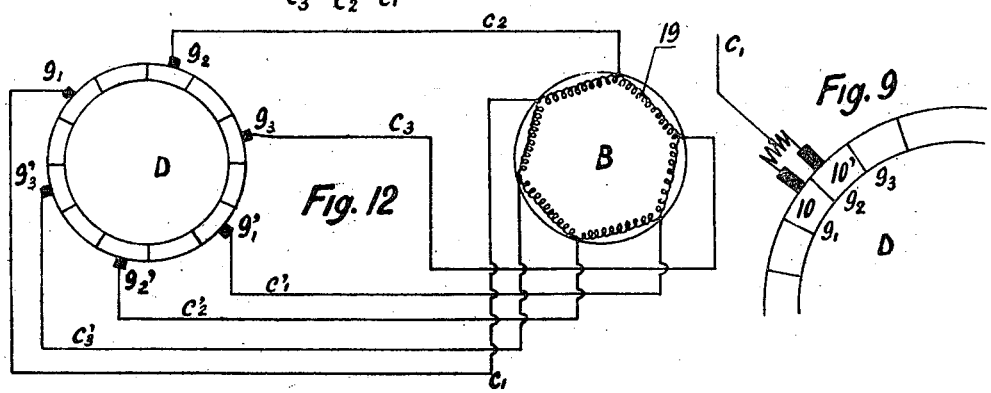
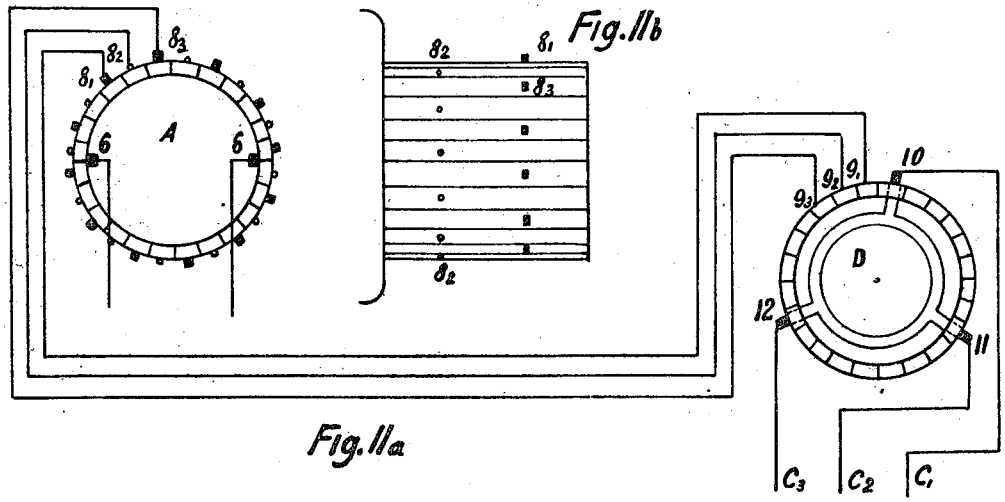

Patented Feb. 2, 1926.

1,571,262

UNITED STATES PATENT OFFICE.

ELIE GRANAT, OF PARIS, FRANCE, ASSIGNOR OF ONE-HALF TO COMPAGNIE DES FORGES ET ACIÉRIES DE LA MARINE ET D'HOMÉCOURT, OF PARIS, FRANCE, A FRENCH CORPORATION.

ELECTRIC DISTANT-CONTROL SYSTEM.

Application filed May 14, 1924. Serial No. 713,308.

*To all whom it may concern:*

Be it known that I, ELIE GRANAT, a citizen of the French Republic, residing at 10, Rue Caumartin, Paris, France, have invented certain new and useful Improvements in Electric Distant-Control Systems, of which the following is a specification.

My invention relates to a distant control system in which the rotation of the receiving element depends upon the rotation of the transmitting element in such manner that by placing the transmitting element in any one of a certain number of predetermined positions, the receiving element will occupy in the like series of predetermined positions the one corresponding to the given position of the transmitter.

In my French Patent No. 540,353, filed on the 14th of January, 1921, and in my French Patent No. 564,858 filed on the 22nd of July, 1922, entitled "Distant control electric transmission system," I described continuous electric distance control systems comprising a transmitter and a receiver, with their connecting lines, essentially constituted as follows: The said transmitter is an electric machine comprising an armature with commutator and supplied with continuous current. Brushes co-operating with the commutator are mounted upon a revoluble device, and are adapted to collect in a continuous manner and to send into the line wires a polyphase current whose frequency corresponds to the speed of rotation of the said brushes. The receiver is a self-starting synchronous motor whose stator is supplied by the line wires while the rotor is supplied with continuous current (or inversely).

In distant control systems of this type, the receiver will rotate in a continuous manner, provided the transmitter has likewise a continuous rotation.

On the contrary, in the distant control system according to the present invention, the receiver has only a certain number of well-defined positions per revolution, and as to the results thus obtained it is analogous to the known distant control systems of the impulse type wherein the receiver is a soft iron rotor movable in the field of a certain number of electromagnets which are energized in succession. However my said system obviates the major part of the serious drawbacks inherent in the impulse apparatus and in particular it prevents any definitive lack of coincidence in the distant control arrangement.

In the present invention, the distant control system comprises—as in the above-mentioned patents—a transmitter consisting of an electric machine having an armature provided with a commutator and supplied with continuous current, and a receiver consisting of a self-starting synchronous motor whereof the stator is connected with the line wires proceeding from the transmitter, and the rotor is supplied with continuous current (or inversely). But instead of directly collecting the polyphase current—to be sent into the line wires—by means of brushes rotating about the commutator of the transmitter armature, I employ a set of fixed brushes cooperating with the said commutator, so that each brush will be brought to a well-determined potential; these potentials are sent into the circular series of stationary segments of a suitable distributer, co-operating with movable contact pieces or brushes connected with the line wires proceeding to the receiver.

The receiver preferably consists of a synchronous motor whereof the field is supplied with continuous current and the polyphase armature—adapted to operate as a stator or as a rotor—is supplied by the line wires proceeding from the said movable contact pieces. In a particular form of construction of the receiver, I may instead of supplying the field with continuous current, employ a field which consists (in the same manner as the armature) of a polyphase winding supplied by the line wires, the magnetic flux of the said field rotating in the same direction as the armature flux, or in the contrary direction.

The following description, together with the appended drawings, sets forth various embodiments of the invention which are given solely by way of example and are not of a limitative nature.

Figure 2:
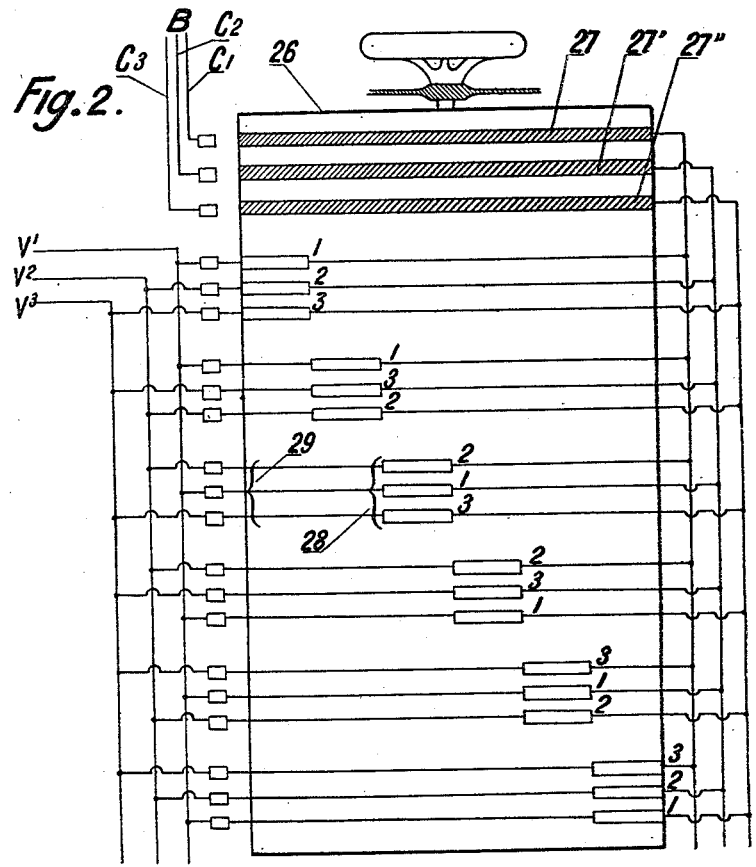
Figure 7:
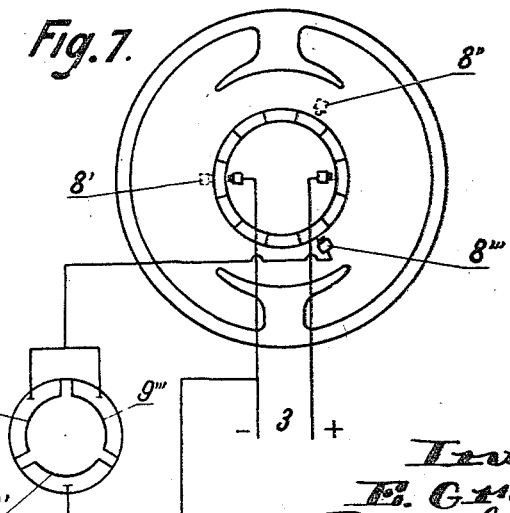
Figure 3:
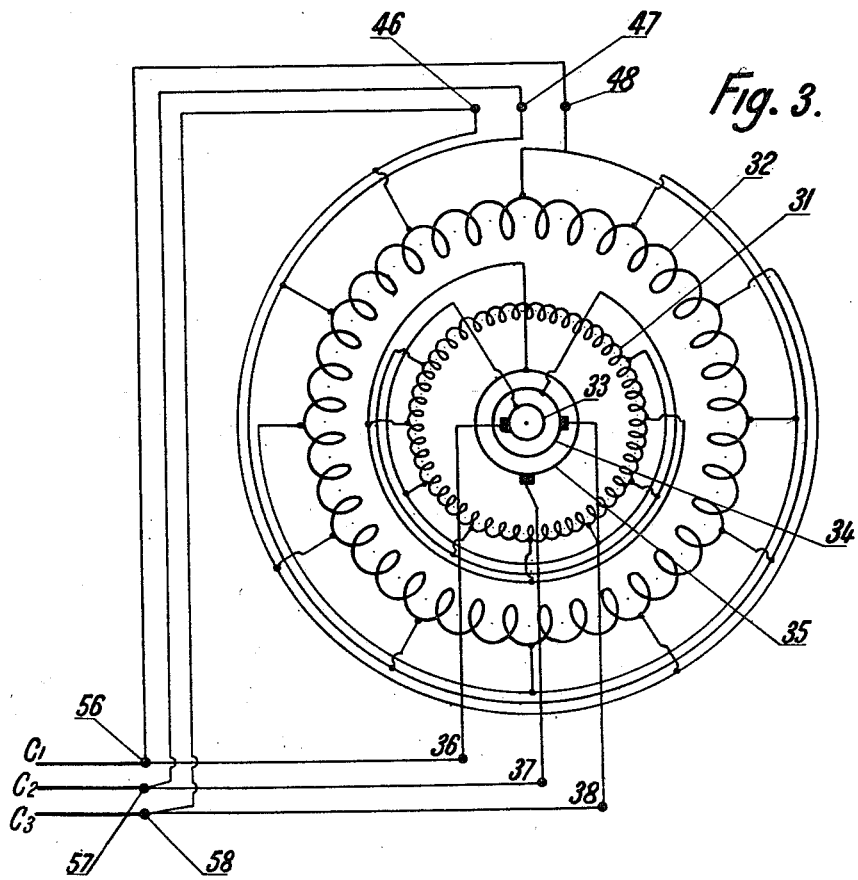
Figure 4:
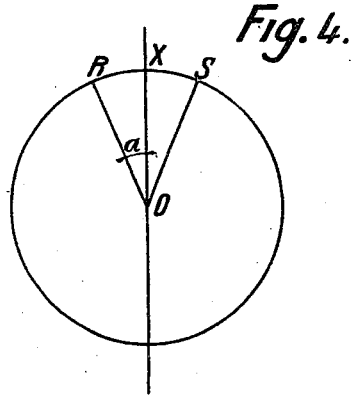
Figure 5:
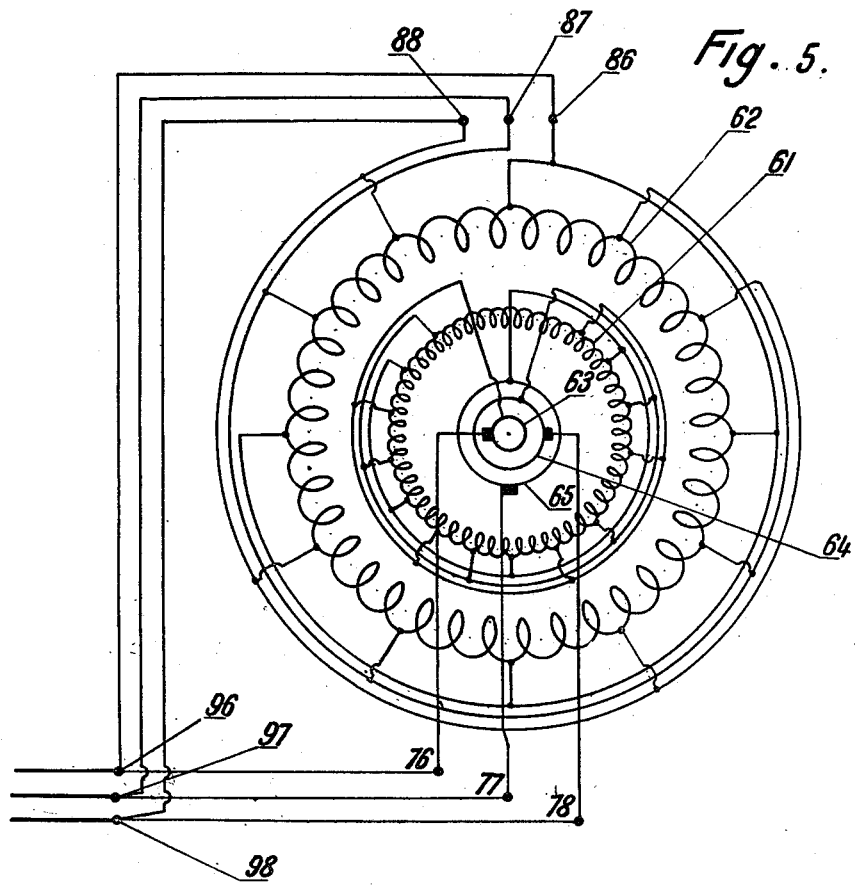
Figure 6:
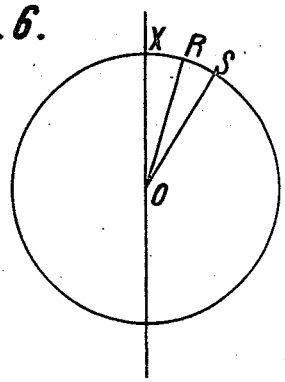

Fig. 1 shows the distant control arrangement wherein the receiver comprises a field supplied with continuous and an armature supplied with three-phase current. Fig. 2 relates to a distributer in the form of a controller. Fig. 3 shows a receiver in which the field (like the armature) is supplied with polyphase current, the magnetic flux of the field and armature (which have the same number of poles) rotating in contrary directions. Fig. 4 shows a like device. Fig. 5 illustrates a receiver wherein the field is supplied (like the armature) with polyphase current, the magnetic flux of the field and armature (which have a different number of poles) rotating in the same direction. Fig. 6 is a corresponding view. Fig. 7 shows a simplified form of distant control apparatus. Figs. 8 to 12 are detail views.

The transmitter A is an electric machine, and may be either a dynamo or a motor. A motor is preferably employed, because the polyphase generator thus constituted, as will be futher explained, operates only as a converter with variable frequency. The converter has certain advantages over the dynamo such as high efficiency and reduced heating.

The stator of said motor comprises the windings 1, 2 which are supplied with continuous current from the source 3. The rotating armature 4 is provided with a commutator 5 also supplied with continuous current from the source 3 by means of the brushes 6. Surrounding the said commutator is a ring 7 carrying a set of brushes (12 in number as herein represented) $8_1$ $8_2$ ... $8_{12}$; said brushes co-operate with the commutator and have a fixed position.

The distributer D consists of a ring comprising a plurality of segments $9_1$ $9_2$ ... $9_{12}$ insulated from each other and connected respectively with the corresponding brushes $8_1$ $8_2$ ...... $8_{12}$. It is observed however that if the fixed brushes $8_1$ $8_2$ ... $8_{12}$ are regularly spaced apart and are symmetrical with reference to the main brushes 6 of the motor, the potentials of said brushes will be equal in pairs; this being the case, instead of 12 conductors connecting the brushes to the said segments 6 or 7 conductors will suffice; generally speaking, if $n$ brushes are used, $$\ldots \frac{n}{2}$$

or $$\frac{n}{2}+1$$

conductors will suffice.

Upon the distributer, three contact pieces 10, 11 and 12 are rotatably mounted and connected respectively with the line wires $C_1$, $C_2$, $C_3$. These contact pieces move over the segments and transmit the current taken off the said segments, to the receiver.

The receiver B consists of a synchronous motor; the field windings 13, 14 are supplied with continuous current from the source 15; the armature has a three-phase winding 17, 18, 19 provided with the collector rings 20, 21, 22, connected by means of the brushes 23, 24, 25 with the line wires $C_1$ $C_2$ $C_3$, respectively.

The operation of the said transmitting arrangement is as follows:

When the transmitter is operated, each of the brushes $8_1$, $8_2$, $8_3$ ... $8_{12}$ is brought to fixed potential of a well-determined value; these potentials are transmitted respectively to the several segments $9_1$ $9_2$ $9_3$ of the distributer. The rotating contact pieces 10, 11, 12 come successively into contact with different combinations of three segments, thus combining these potentials and transmitting them to the armature windings of the receiver, in which they will set up well-determined currents in each case. These currents produce three corresponding fluxes whose resultant has a well-defined position in the rotor corresponding to the potentials over the line; the rotor will thus turn until the said resultant becomes parallel and opposite to the uniform flux from the poles of the stator. For a two-pole stator, this position of equilibrium of the rotor is single, and is a position of stable equilibrium, so that for each position of the set of three contact pieces 10, 11, 12 which constitute the controlling element, a well-defined position of the receiver will be obtained.

Theoretically, the number of positions which can be transmitted for one revolution of the receiver is quite considerable; in the case of Fig. 1 it is equal to the number of possible combinations of 12 objects in groups of three and in groups of two, one condition that one varies the angular setting of the three contact pieces 10, 11, 12 and with the optional elimination of one contact piece. But a more careful examination of the question shows that the torque upon the rotor of the receiver is quite variable according to the group of three or of two potentials in use. It can be readily demonstrated that this synchronizing torque of the receiver is constant and has a maximum value each time that the three potentials transmitted correspond—upon the commutator 5—to three brushes having a fixed angular spacing and forming the vertices of an equilateral triangle, as in the case for Fig. 1.

The number of positions of the receiver corresponding to one revolution of the distributer can be much increased by making use not only of the direct positions of the contact pieces 10, 11, 12 upon the said distributer ring, i. e. the positions in which each contact piece is in contact with a single segment of the distributer, but also of the intermediate positions in which a given contact piece is in contact with two adjacent segments at the same time. When this occurs, the contact piece is brought to a potential value of which is between the values of potentials of the two adjacent segments; thus the number of positions in which the contact piece can be brought to a different potential is doubled. To proceed from one position of the distributer to any other position, one may break the circuit without inconvenience, for each position of the controlling element corresponds to but one position of the receiver; this is not the case for distant control systems using electromagnets, in which any rupture of the line circuit when the transmitter proceeds from one position to another will cause a definite angular displacement of the transmission.

But when a given contact piece of the distributer is in contact with two adjacent segments which may have very different potentials, the electric circuit comprising the wires connecting these segments with corresponding brushes will be closed and a current will pass through the contact piece, said current being greater as contact piece is larger. This current is of no use whatever and is only lost. If intermediate positions are used, it is essential to diminish this current so as to prevent the heating of the distributer and the deterioration of the contacts. This result may be obtained as follows.

*a.*—Auxiliary resistances are placed in the lines connecting the brushes $8_1$ $8_2$ $8_3$ with the contact pieces $9_1$ $9_2$ $9_3$ (Fig. 8).

*b.*—The said movable contact pieces consist in each case of two copper brushes connected together through a resistance serving as the output end of the line (Fig. 9).

*c.*—Each of the said contact pieces 10, 11, 12 consists of two copper brushes held together by material insulating one brush from the other, each of which is connected by a separate line wire to the receiver; in this event the line must comprise six wires, and the receivers will contain two three-phase windings upon a common rotor (Fig. 10). Thus these two windings will both be at the same potential when contact pieces are entirely on one segment. When both copper-brushes of contact pieces are on different segments the corresponding phases of windings of receiver rotor are brought to different potentials and the resulting action of said phases is the same as if they were both brought to one same intermediary potential.

Obviously, the number of positions of the receiver may be increased by using commutators of several similar transmitting devices A, brushes $8_1$, $8_2$ ... $8_{12}$ of which have a regular angular displacement from one commutator to the other, or by having various rows (Figs. $11_a$ and $11_b$) of fixed brushes placed in different sections of one same commutator, the rows having an angular displacement with reference to each other. One may further employ four or six movable contact pieces upon the distributor, the receivers now consisting of 4-phase or 6-phase synchronous motors. A six phase device of this sort is shown on Fig. 12.

On the contrary, should it be sufficient to use a limited number of transmitted indications, the system may be greatly simplified.

In the case in which it suffices to employ three fixed brushes 8′ 8″ 8‴ on the commutator, Fig. 7, one of these brushes 8′ may be made to coincide with a brush 6 (negative in the case of Fig. 7) of the continuous current supply circuit of the armature. In this manner only two additional brushes—8″ and 8‴—will be necessary. It will also be observed that since the brushes 8″ and 8‴ are symmetrical with reference to the positive brush 6, the potentials of these two brushes have the same sign and an equal value, so that a single additional brush 8‴ and a single wire will be sufficient to connect the source of the polyphase current to two of the segments 9″ 9‴ of the distributer D′, the third segment being connected to the negative wire of the source of current 3. When thus supplied the distributer D′ will produce in the receiver windings a revolving field whose vector is quite constant.

The distributer is disposed in the most suitable manner for the end in view, and the segments may be in the plane or the cylindrical position; the device may have the form of a controller, of which a constructional form is shown in Fig. 2.

In an electric transmission system in which the transmitter A has three fixed contacts or brushes $8_1$ $8_2$ $8_3$ co-operating with the commutator of its armature, the wires leading from the said brushes have the fixed potentials $V_1$ $V_2$ $V_3$, respectively. The controller, Fig. 2, consists of a drum 26 mounted upon a shaft and operated by a suitable hand wheel. At the upper part are disposed three rings 27, 27′, 27″ co-operating respectively with brushes connected to the wires $C_1$ $C_2$ $C_3$ supplying the polyphase winding of the receiver B. Upon the said drum are mounted in helical disposition various sets of three contact strips 28, etc. Corresponding to each set of three strips (28) is a set of three brushes (29), all the sets of brushes 29 being situated on the same vertical line; the three brushes are in each case respectively connected to the line wires $V_1$ $V_2$ $V_3$ of the polyphase supply from the transmittter A, the connections being such that if one considers the aggregrate of the groups of three brushes 29, and in each in the same order, that is, from top to bottom the disposition of the potentials $V_1$ $V_2$ $V_3$, one will find all the combinations which can be produced, i. e., 1, 2, 3—1, 3, 2—2, 1, 3—2, 3, 1—

3, 1, 2—3, 2, 1. In the figure, these combinations are indicated beside each group of three strips (28) co-acting successively with the groups of three brushes (29) during the rotation of the drum. The three strips of each group (28) are respectively connected with the three rings 27, 27', 27'' in the same order in all cases, for instance from top to bottom, as indicated.

The combinations of the potentials $V_1$ $V_2$ $V_3$ taken in the order of the groups of brushes (29) are such as to produce successive displacements of the receiver which are in the same direction in all cases. When a group of strips (28) coincides with its brushes (29) during the rotation of the drum, the corresponding combination of potentials is transmitted to a polyphase winding of the receiver B, and the latter assumes the position corresponding to that of the drum.

In the distant control system according to the invention, the normal receiver is as above stated a two-pole synchronous motor of the three-phase or the polyphase type; the armature of which is supplied by the three line wires can be used as a rotor or a stator. But in apparatus of limited power it may suffice to employ permanent magnets for the field; in this event it is preferable to use the armature as a stator and the permanent magnet as a rotor, thus affording an especially strong device, in view of the absence of all sliding contacts.

If instead of a two-pole receiver, a four-pole synchronous motor is employed, the receiver will rotate at half the speed of the transmitter, and the number of positions per revolution of the receiver may be increased. In this case the electric transmitting means connecting the transmitter with the receiver will operate in the same manner as mechanical gearing whose reduction ratio is represented by the number of pairs of poles of the receiver.

Let it be supposed that the three-phase winding of the receiver has $2p$ poles, for a displacement $a$ of the revolving field, due to the movement of the distributer (the latter being a two-pole device) the revolving field of the receiver will be displaced by $\frac{a}{p}$; so that if the source of polyphase current as well as the distributer are arranged in such manner as to offer $n$ different values for the potential, the receiving apparatus can occupy $n$ determined positions per unit of pole pitch, and therefore $n p$ per revolution for a receiver having $2 p$ poles.

Obviously, fields having several pairs of poles may be obtained simply by the use of permanent magnets, and even a soft iron rotor of suitable design may be employed.

Figs. 3, 4, 5 and 6 show two constructional forms of receivers in which the local supply of the field is dispensed with.

The rotor and the stator of the said receiver each have a three-phase winding in various parts 31, 32; the rotor which is wound on the delta system is provided with the three slip rings 33, 34, 35 connected by brushes to the fixed terminals 36, 37, 38 respectively; the stator has a like winding, which is connected with the three terminals 46, 47, 48 corresponding to the terminals 36, 37, 38. The three line wires $C_1$ $C_2$ $C_3$ from the distributer are connected to the terminals 56, 57, 58, respectively; the terminals 56, 57, 58 are respectively connected to the terminals 36, 37, 38 and 46, 47, 48 in such manner that the revolving fields produced in the stator and the rotor will turn in contrary directions, e. g. 56 is connected to 36 and 48; 57 to 37 and 47; 58 to 38 and 46.

The operation of the said receiver is shown diagrammatically in Fig. 4. Admitting that the receiver is in equilibrium for a given position of the distributer, the rotor and the stator fields will have the same direction, or O X; if the transmitter is rotated through a given angle $a$, the field of the rotor will turn through the same angle and will now occupy the position O R; the stator field will hence occupy a symmetrical position with reference to O X, or O S. The device as a whole will thus act as an ordinary receiver in which the field is disposed according to O S; in consequence, in order that O R shall coincide with O S, the rotor will turn through an angle $2a$; so that herein the receiver will turn through an angle which is twice the angle of rotation of the distributer.

But this arrangement may offer an inconvenience for certain uses, because the receiver rotates at twice the speed of the distributer, so that the parts under control can only be made to rotate through the same angle as the distributer by the use of gearing. In this case the arrangement shown in Figs. 5 and 6 will offer a decided advantage. Instead of moving in the contrary direction, the revolving fields now move in the same direction, the three-phase windings of the stator and the rotor having a different number of poles.

Let it be supposed that the stator winding has $2p$ poles and the rotor field $2(p+1)$ poles; for a displacement $a$ of the revolving field caused by the movement of the distributer, the stator field will be displaced through $\frac{a}{p}$ and the revolving field of the rotor through $$\frac{a}{p+1}.$$

Fig. 6 shows diagrammatically the displacements of two revolving fields, starting from the position of equilibrium O X. The vector of the stator field will take the direction O S and the vector of the rotor field the position O R. The displacement between the two fields will be $$OR - OS = \frac{a}{p} - \frac{a}{p+1} = \frac{a}{p(p+1)}$$

The said device might be considered as forming an electric vernier.

In the case of Fig. 5 for example, the rotor winding $6_1$ has 6 poles and the stator winding $6_2$ has 4 poles. A displacement $a$ of the revolving field of the distributer corresponds to a displacement of the receiver of $$\frac{a}{2 \times 3} = \frac{a}{6}.$$

As in the case of Fig. 3, the rotor winding (Fig. 5) is connected to the rings 63, 64, 65 which are respectively connected to the fixed terminals 76, 77, 78. The stator winding is provided with the three terminals 86, 87, 88. The line wires $C_1$ $C_2$ $C_3$ are connected respectively to the terminals 96, 97, 98 which are connected respectively to the terminals 76, 77, 78 and 86, 87, 88 in such manner that the stator and rotor turn in the same direction. For instance 96 is connected to 76 and 86; 97 to 77 and 87; 98 to 78 and 88.

The transmitting system according to my invention will afford a solution for all the problems of distant control, from the control of switches to the control of apparatus for handling material, it being simply necessary to design the receiving motors for the required use.

By the transmitting system according to the invention, I am enabled to eliminate the major part of the drawbacks inherent in transmission by electromagnets, or by impulses of current. The principal features of the said system are as follows:

1.—The transmitting arrangement provides for a great number of positions per revolution, these depending solely upon the combined values of the potentials taken from the transmitter, while in the transmitting systems by electromagnets, the positions depend altogether upon the number of electromagnets, this being in all cases very limited for constructional reasons.

2.—The movement of the receiver is not produced by the make and break of current in the coils, but by the rotation of a revolving field in a magnetic circuit with constant air-gap.

The receiving motor will thus operate in the same conditions as the known synchronous motors, and with a very high efficiency.

Further, in the apparatus formed by combinations of electromagnets, only half of the energy supplied can be converted into mechanical work, the other half serving to augment the potential energy of the electromagnetic system, and besides, this 50 per cent maximum yield represents only a theoretical case which cannot be realized in practice and in which the mechanical efficiency of the system would have to be 100 per cent.

This consideration is of special importance for the installation of distant control systems using lines of great length, since for an equal power the current required for their operation is much smaller in my said arrangement, so that the cross section of the conductors can be reduced.

3.—For a given position of the distributor, a two-pole receiver will have only one position of equilibrium, or a single position per revolution; so that an imperfect contact in the distributer may cause the apparatus to jump over one or more indications without inconvenience, and the apparatus will assume its corresponding position as soon as the circuit is again closed. It should be observed however that where multipolar motors are employed, the admissible error without the risk of angular displacement is $\frac{2\pi}{p}$.

4.—The synchronizing torque between the two parts of the receiver is considerable when at the maximum, and it can be increased to any desired degree. From this point of view, the transmitting system has the same advantages as offered by the system constituting the object of my previous French Patents No. 540,353 of January 14th, 1921, and No. 564,858 of July 22nd, 1922.

5.—The said distant control arrangement is of a simple and substantial construction, all of its elements being those employed for the usual synchronous motors, and no regulating devices being required.

What I claim is:

1. An electric distant control system for discontinuous operation comprising an electric D. C. machine having an armature and field piece, a commutator on said armature, a set of $m$ stationary brushes round commutator, a set of $m$ contact segments, wires connecting stationary brushes with corresponding segments, a set of $n$ distributing brushes adapted to move over contact segments, means for controlling same, a synchronous motor, stator and rotor of said motor, a $n$-phase winding on rotor of motor, line wires connecting distributing brushes to corresponding phases of rotor winding.

2. An electric distant control system for discontinuous operation comprising an electric D. C. machine having an armature and field piece, a commutator on said armature, a set of $m$ stationary brushes round commutator, a set of $m$ contact segments, wires connecting stationary brushes with corresponding segments, a set of $n$ distributing brushes adapted to move over contact segments, means for controlling same, a synchronous motor, stator and rotor of said motor, a $n$-phase winding on rotor, of motor, line wires connecting distributing brushes to corresponding phases of rotor winding, a device whereby short-circuiting current passing through distributing brush when said brush is in contact with two contact segments at the same time is reduced.

3. An electric distant control system for discontinuous operation comprising an electric D. C. machine having an armature and field piece, a commutator on said armature a set of $m$ stationary brushes round commutator, a set of $m$ contact segments, wires connecting stationary brushes with corresponding segments, a double set of $n$ distributing brushes adapted to move over contact segments, insulating material holding together corresponding brushes of both sets, means for controlling same, a synchronous motor, stator and rotor of said motor, two parallel $n$-phase windings on rotor of motor, line wires connecting distributing brushes to corresponding phases of corresponding rotor winding.

4. An electric distant control system for discontinuous operation comprising an electric D. C. machine having an armature and field piece, a commutator on said armature, a set of $m$ stationary brushes round commutator, a set of $m$ contact segments, wires connecting stationary brushes with corresponding segments, a set of $n$ distributing brushes adapted to move over contact segments, means for controlling same, a synchronous motor, stator and rotor of said motor, a $n$-phase winding on rotor of motor, a $n$-phase winding on stator, line wires connecting distributing brushes to corresponding phases of rotor winding and of stator winding.

5. An electric distant control system for discontinuous operation comprising an electric D. C. machine having an armature and field piece, a commutator on said armature, a set of $m$ stationary brushes around commutator, a set of $m$ contact segments, wires connecting stationary brushes with corresponding segments, a set of $n$-distributing brushes adapted to move over contact segments, means for controlling same, a synchronous motor, stator and rotor of said motor, a $n$-phase winding on rotor of motor, a $n$-phase winding on stator, having a different number of poles than winding of rotor, line wires connecting distributing brushes to corresponding phases of rotor winding and of stator winding whereby fields produced in rotor and stator rotate in the same direction.

In witness whereof I have hereunto set my hand.

ELIE GRANAT.